United States Patent Office 3,161,468
Patented Dec. 15, 1964

3,161,468
PROCESS FOR PRODUCING HOLLOW SPHERES OF SILICA
Robert J. Walsh, Dayton, Ohio, assignor to Monsanto Company, a corporation of Delaware
No Drawing. Filed Jan. 3, 1961, Ser. No. 80,041
1 Claim. (Cl. 23—182)

The present invention relates to the production of a novel form of silica. It is an object of the invention to produce a form of silica existing as hollow spherical shells of extremely small particle size. It is an object of the invention to prepare the new form of silica by a flame combustion process in which a variety of siliceous materials may be employed. It is also an object of the invention to prepare a powdered silica material of small particle size and having a controllable density in order to prepare various end products having utility in various industrial relationships.

The conventional method for the manufacture of silica is a wet precipitation process in which sodium silicate is neutralized with sulfuric acid in order to obtain a silica sol. However, it is very difficult to handle such a sol and to purify the same preliminary to a conventional oven drying step, which yields a coarse granular silica to be subjected to a fragmentation step. The individual particles resulting from this process have sharp, angular and quite irregular shapes and are also characterized by high density.

It has now been found that a form of silica existing as amorphous micro particles of generally spherical or spheroidal shape is obtained when a silica sol is fed directly in finely divided state to a combustion flame in which its solvent medium is vaporized and the silica content transformed to the desired spherical shaped particles.

The siliceous material employed in the present invention utilizes a liquid medium preferably water, although organic solvents in which the silica sol is dispersed may also be employed. Examples of such organic media include methanol, ethanol, acetone and methyl ethyl ketone. A further advantage resulting from the use of an organic solvent is the combustibility of the solvent with the result that the heat input into the flame is increased as a result of the combustion of the solvent. The siliceous material employed as the starting component in the present process may be a silica sol of which various types are available in various concentrations of silica in water. For example, concentrations of from 5% to 30% $SiO_2$, weight basis, are suitable in the present process. The silica sol may also be prepared in situ in the starting solution, for example by adding to sulfuric acid a diluted commercial sodium or potassium silicate solution in known manner to form the silica sol. Such a sol may be used directly as the starting material in the present flame combustion process, or, if higher purity silica product is desired, may be first subjected to various purification methods such as ion exchange, dialysis, etc. to remove ionic contaminants.

The present process employs a very rapid, high temperature treatment of a finely dispersed liquid silica sol to prepare silica in a specific physical form. The silica sol starting material may be dispersed into the flame using any of a number of known atomization methods, a preferred method being the use of a two fluid, parallel flow nozzle to which an atomizing gas is supplied in sufficient quantity to atomize the liquid feed. The atomizing gas may be inert or may contain oxygen (e.g., pure oxygen or air) or preferably is a combustible gas such as hydrogen, natural gas, coke oven gas or various combustible gas streams which may be available. The gas for combustion and the atomizing gas are supplied to the atomizing burner nozzle which projects the flame into a combustion chamber. The combustion chamber may have either refractory lined or water cooled metal walls. When combustion occurs, the fuel gas and/or the solvent gases are burned as an oxidizing or reducing or neutral flame to provide rapid uniform heating and at the same time permit transformation of the siliceous material of the feed solution to the desired physical form of spherical or spheroidal particles. The atomizing carrier gas may be employed in the minimum amount required to atomize the solution, or may be used in excess. When the atomizing gas is used in excess, the proportions are such as to provide sufficient heat input to heat the aqueous or solvent dispersion feed to a flame temperature of from 600° C to 1800° C., a preferred range being from 1000° C. to 1600° C., for a residence time of 1 second to 0.001 second, a preferred range being from 0.1 second to 0.01 second. In order to provide for sufficient heat, the combustion of the organic fuel and any organic solvent may be supplemented by the combustion of a gas such as hydrogen, carbon monoxide or natural gas with air or oxygen. The combustible gas is therefor supplied in amount sufficient to maintain the silica particles in the reaction zone at the desired temperature as set forth above. The particles leaving the flame are cooled by direct or indirect heat exchange and are then collected by suitable means such as by a water scrubber, cyclone separator, electrostatic precipitator, or a bag filter.

As stated herein the term "silica sol" refers to a liquid colloidal suspension of silica in either water or an organic medium, preferably methanol, ethanol, acetone, or methyl ethyl ketone.

The following examples illustrate specific embodiments of the invention.

*Example 1*

The preparation of spheroidal hollow particles of silica was carried out in a vertical stainless steel combustion tube. The siliceous source was provided from 10.5 lbs. of a 37.6% aqueous solution of sodium silicate having 3.33 moles of $SiO_2$ per mole of $Na_2O$. The sodium silicate solution was further diluted with 15.6 lbs. of water and this solution was then added to a diluted solution of sulfuric acid containing 1.61 lbs. of $H_2SO_4$ and 5.35 lbs. of water. The addition was carried out slowly while stirring vigorously, resulting in the formation of a sol containing 9% $SiO_2$ and about 6.4% dissolved $Na_2SO_4$, and 86.6% by weight of water. This sol was fed into the atomizing burner of the vertical combustion tower at a rate of 4.6 lbs. per hour.

The atomizing gas which was employed to disperse the silica sol was composed of natural gas supplied at the rate of 5.3 lbs. per hour. The burner of the combustion tower also had a pilot burner to which natural gas was supplied at the rate of 1.54 lbs./hr. The total air supply to the burners was at the rate of 172 lbs./hr. When the liquid feed mixture was dispersed into the burner flame, water was flashed into steam and silica sol was dehydrated to silica in the form of spherical and spheroidal particles. The gas mixture containing the silica particles passed down through the combustion tower to a water spray cooling and collection zone which was supplied with water at the rate of 270 lbs./hr. The silica product was recovered as a dispersion in the collection water which was then allowed to settle and the silica product obtained by decantation and filtration. The silica filter cake was washed with fresh water to reduce the sodium contents to less than 2%. After drying, the product had a bulk density of 55 lbs./cu. ft. When the product was examined under the electron microscope, it was found that the silica existed as hollow spherical shells of from 0.2 to 20 microns diameter the average being about 8 microns, with some irregular spherical and spheroidal fragments also being present.

It has been found that the spheroidal particles of silica as produced by the present method are of utility as flatting agents in paints and other coating compositions, catalyst supports, and also as filters in rubber compositions and in plastics.

*Example 2*

In order to produce a high purity silica, the process of the preceding example was conducted utilizing a commercial aqueous silica sol as the starting material. The silica sol contained 30% by weight of $SiO_2$ and 70% by weight of water. The product obtained was similar to that of Example 1, being comprised almost entirely of spherical hollow shells having diameters of from 2 to 50 microns with the average diameter being from 10 to 12 microns. The resultant product had a purity of 99.5%, on a weight basis.

The densities of the products of Example 1 and 2 were 0.88 and 0.69, respectively. In general, the density of the product is controlled by varying the flame temperature, i.e., a higher temperature gives a low density silica, while a lower temperature gives a higher density product.

What is claimed is:

Process for the manufacture of hollow, spheroidal particles of silica, which comprises dispersing a silica sol of from 5% to 30% $SiO_2$ content, weight basis, with the remainder being a solvent selected from the group consisting of water, methanol, ethanol, acetone, and methyl ethyl ketone, into a flame at a temperature of from 600° C. to 1800° C., for a residence time of 1 second to 0.001 second, volatilizing the said solvent, and dehydrating the said silica sol into spheroidal particles of silica.

References Cited in the file of this patent

UNITED STATES PATENTS

| | | |
|---|---|---|
| 1,506,118 | Govers | Aug. 26, 1924 |
| 1,903,187 | McClenahan | Mar. 28, 1933 |
| 2,151,083 | Christensen et al. | Mar. 21, 1939 |
| 2,535,659 | Wolff | Dec. 26, 1950 |
| 2,676,892 | McLaughlin | Apr. 27, 1954 |
| 2,697,025 | Fulton et al. | Dec. 14, 1954 |
| 2,797,201 | Veatch et al. | June 25, 1957 |
| 3,002,808 | LaMont | Oct. 3, 1961 |